Figure 5:
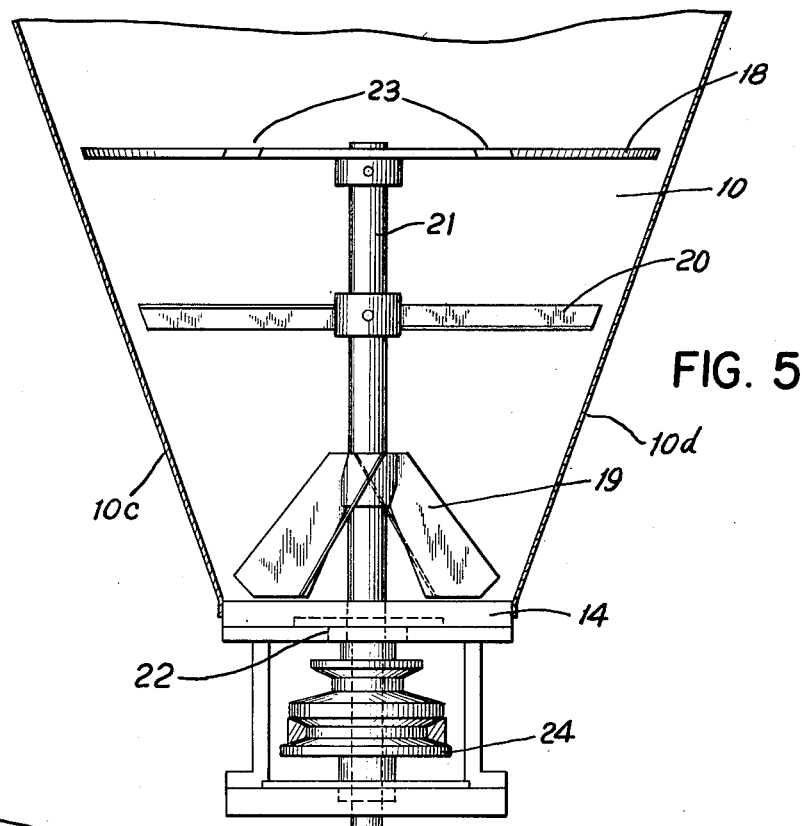

Dec. 21, 1954   L. V. BLACK ET AL   2,697,676
METHOD FOR CONTINUOUS MICA APPLICATION
FOR BENT WINDSHIELDS
Filed Sept. 29, 1951   4 Sheets-Sheet 1
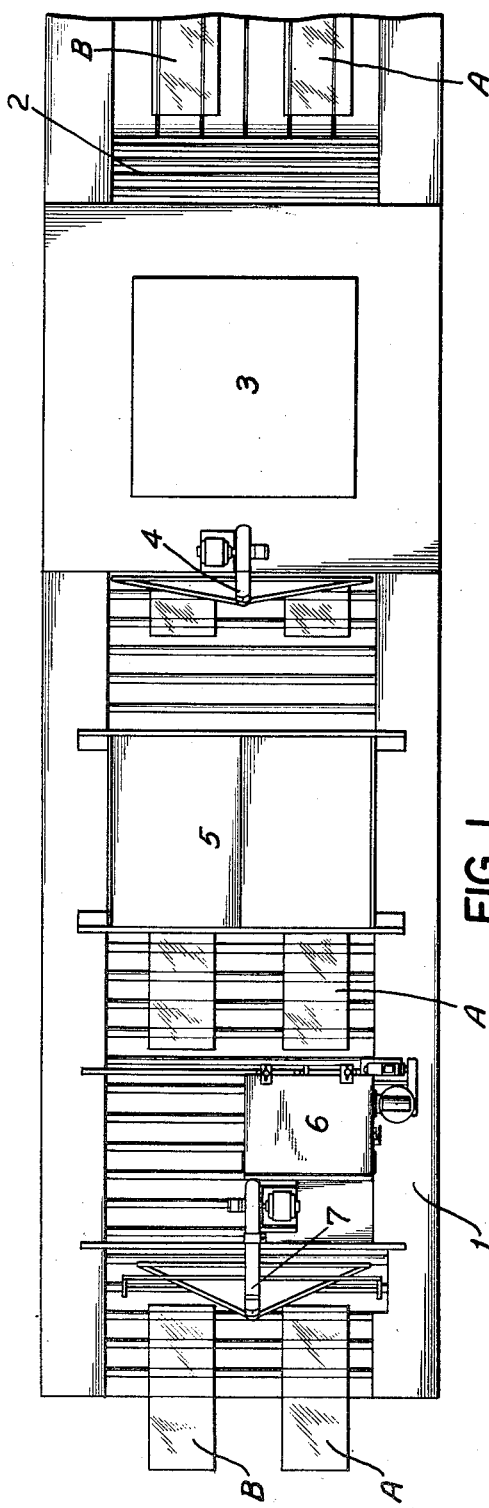
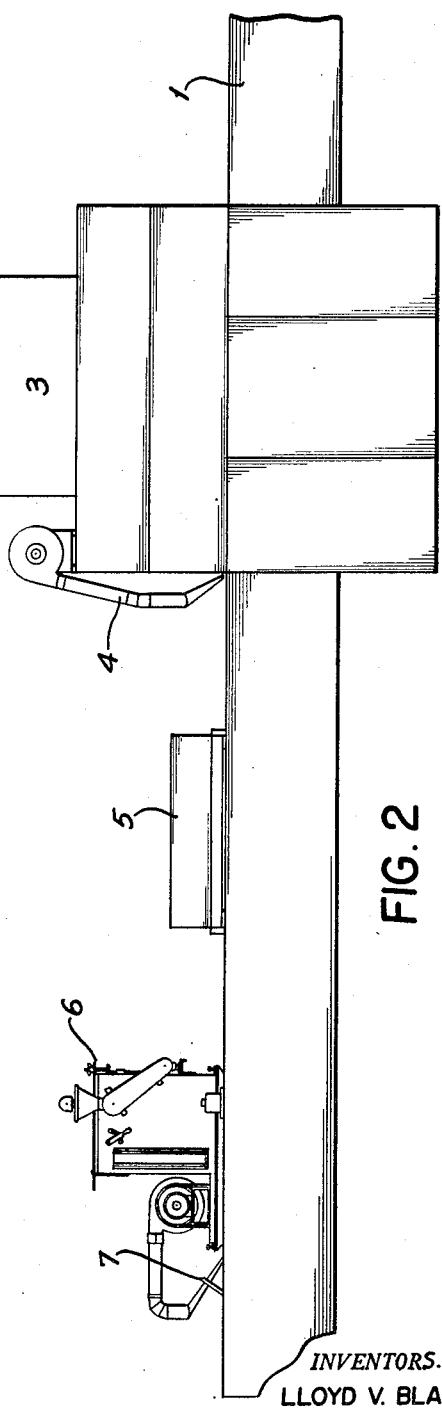
INVENTORS.
LLOYD V. BLACK
FLORIAN V. ATKESON
BY
Oscar L. Spencer
ATTORNEY

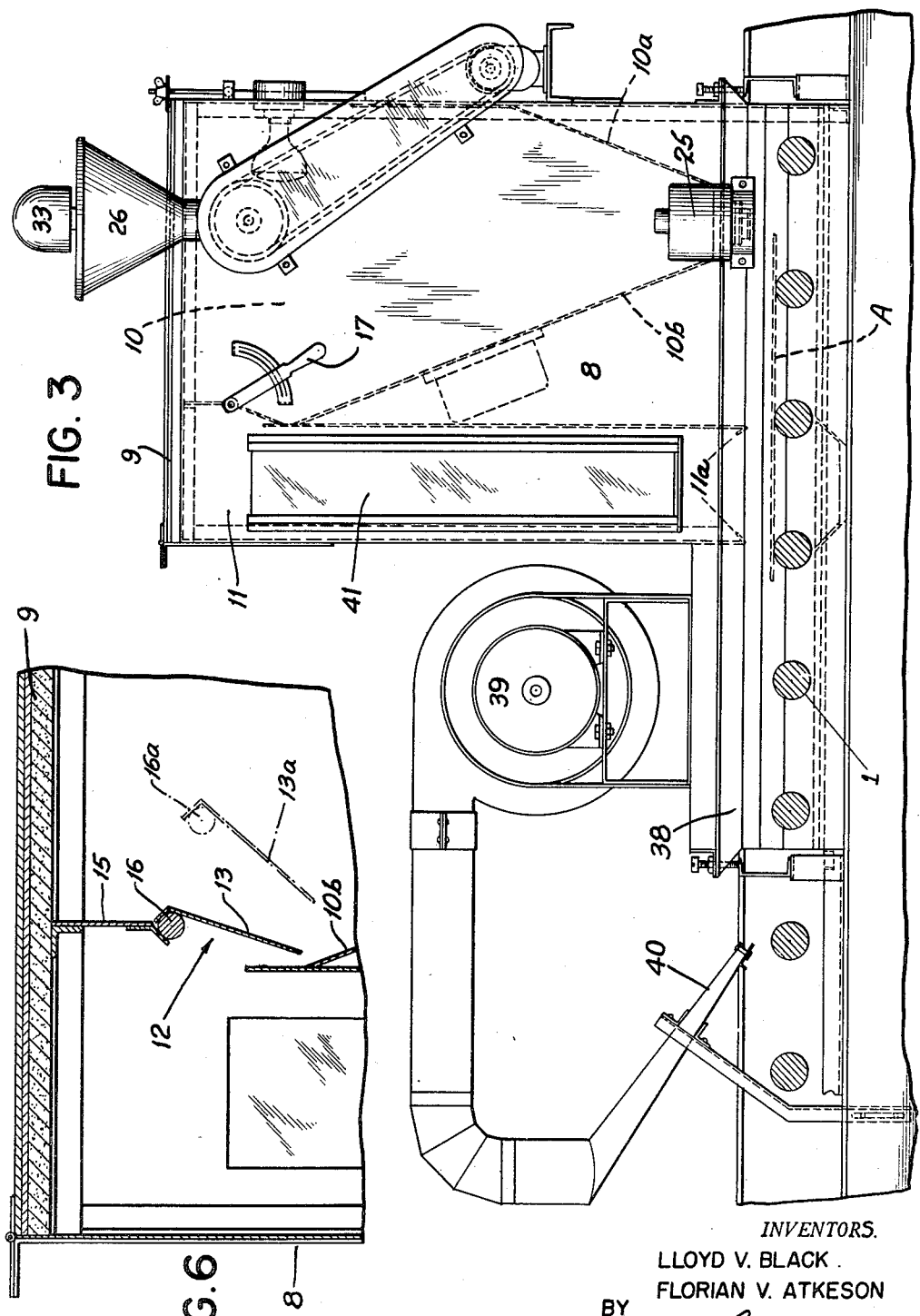

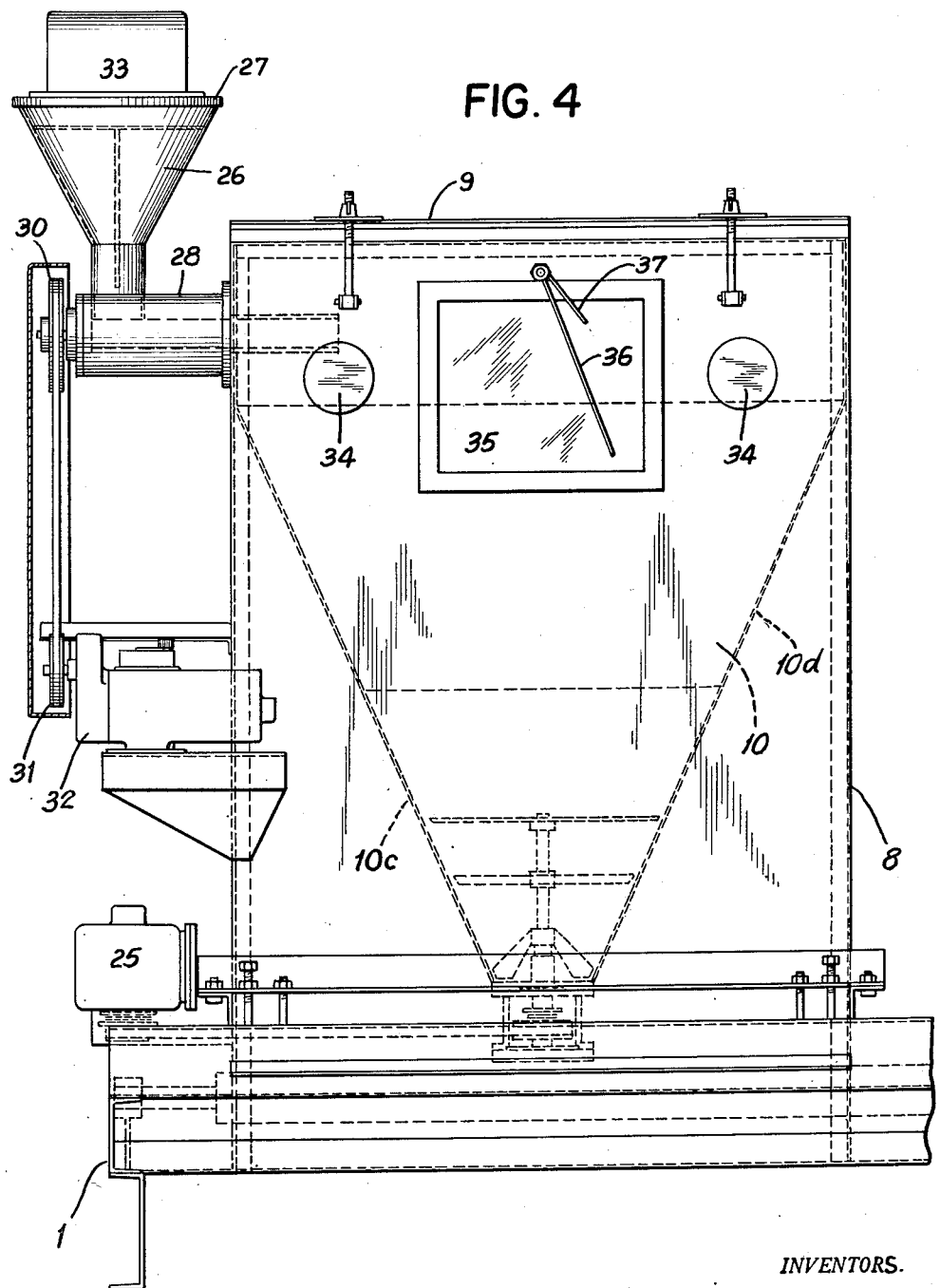

INVENTORS.
LLOYD V. BLACK
FLORIAN V. ATKESON
BY
Oscar L Spencer
ATTORNEY

United States Patent Office 2,697,676
Patented Dec. 21, 1954

2,697,676

METHOD FOR CONTINUOUS MICA APPLICATION FOR BENT WINDSHIELDS

Lloyd V. Black, Tarentum, and Florian V. Atkeson, Springdale, Pa., assignors to Pittsburgh Plate Glass Company Application September 29, 1951, Serial No. 248,922

6 Claims. (Cl. 154—2.73)

This invention pertains in general to the protection of glass surfaces, and specifically to protection of adjacent glass surfaces during simultaneous bending of a plurality of glass sheets or in stacking a plurality of glass sheets for transportation.

The invention resides in the method and apparatus for applying a thin uniform coating of protective material to one or both adjacent surfaces of a stack of two or more glass sheets.

One object of the invention is to provide a method for applying a coating of protective material between adjacent surfaces of two sheets which will prevent fusion of the adjacent glass surfaces during multiple bending preparatory to forming laminated glass sheets.

Another object of the invention is to provide a method for applying a sufficiently thin coating of the protective material as will provide adequate protection against fusion during bending and yet not require removal from the glass prior to the laminating operation.

Another object of the invention is to provide a method for continuously and mechanically preparing pairs of glass sheets for bending without fusion and lamination without further treating of the surfaces engaging the plastic inner layer of the finally laminated sheet.

A further object of the invention is to provide a protective material which is effective to prevent fusion during bending of the glass and can remain on the glass during the laminating process in producing commercially acceptable bent laminated glass windshields.

A still further object of the invention is to provide an apparatus for mechanically applying a thin uniform coating of the finely divided protective material to a surface.

The problem of protecting the surfaces of glass sheets arises frequently during the fabrication of articles from glass sheets and the packaging of glass sheets for transportation. During fabrication of bent laminated glass sheets for various purposes, the sheets are usually assembled in pairs upon molds for bending and thereafter the pairs of bent sheets are separated for the purpose of inserting a plastic interlayer between the sheets before bonding the whole into a unit within an auto-clave under suitable temperature and pressure conditions.

The protective material between the adjacent surfaces of the glass sheets during the bending operation must not only protect the surfaces as one sheet possibly moves relative to the other during the bending operation but must also prevent fusion of the adjacent glass surfaces at the high temperatures necessary to effect the bending of the glass sheets. One previous method of protecting the glass surfaces was to spray the surfaces with a water soluble material which was chemically inert to the glass. After spraying, the sheets were dried and assembled in pairs for bending. After bending, the sheets were separated and washed to remove the water soluble coating. Such a method entailed considerable handling of the sheets during the coating and washing operations with the ever present possibility that all of the protective material would not be removed during the washing operation.

Other known methods of protecting the surfaces during multiple bending were to hand dust the glass surfaces with various materials to prevent fusion of glass surfaces during bending and to thereafter wash or wipe the material from the surfaces prior to the laminating operation. Obviously such methods also entailed considerable handling and packing or storage of the glass which was quite expensive and therefore uneconomical.

In the method hereinafter disclosed and claimed the glass sheets are handled but once for applying a uniform coating of finely divided mica and no further preparation of the sheets, after bending, is necessary before inserting the plastic interlayer for the laminating operation. Obviously with such a method the coating of glass sheets can be so synchronized with the bending and laminating operations that straight line production can be effected from the first operation of washing the sheets prior to coating to the last operation preparatory to loading the sheets into the autoclave for the final step of lamination.

Figure 7:
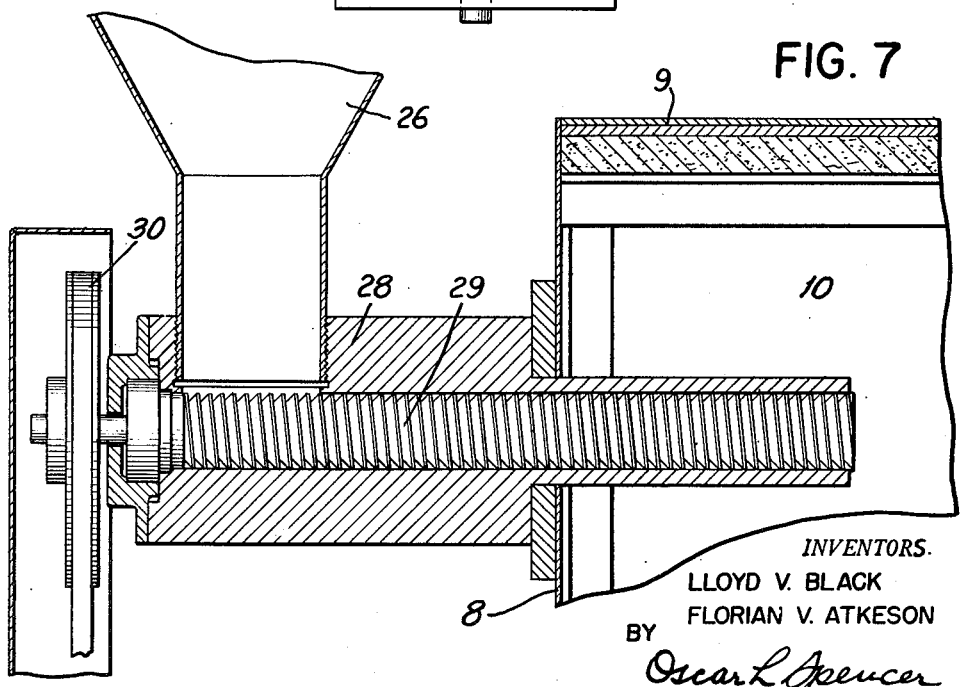

In the drawings forming a part of this disclosure, Fig. 1 shows in plan the entire apparatus; Fig. 2 shows in elevation the apparatus of Fig. 1; Fig. 3 is an enlarged side elevation of the mica applicator; Fig. 4 is an enlarged elevation of the mica applicator; Fig. 5 is an enlarged section through the cloud chamber at right angles to the view of Fig. 3 showing the cloud forming apparatus; Fig. 6 is an enlarged view of the passageway between the cloud chamber, settling chamber and damper; Fig. 7 shows an enlarged view of the mica feed mechanism.

The apparatus of Figs. 1 and 2 reading from right to left, includes a conveyor 1 for conveying the glass sheets through the apparatus, washer feed rolls 2, washer 3, heater 5 and the mica applicator 6. As illustrated in Fig. 2 it is usual to apply mica to but one sheet when the glass sheets are being bent in pairs to form windshields and for this purpose the mica applicator 6 extends but half way across the conveyor so that as the pairs of sheets A and B move side by side down the conveyor, but one sheet A is coated with the mica.

As shown in drawings Fig. 1 the conveyor 1 may be of any desired form and is primarily for the purpose of feeding the glass sheets through the mica applicator 6. The conveyor is preferably of sufficient length that a plurality of pairs of glass sheets A and B can be laid thereon for feeding to the washer 3. The roll stand 2 before the washer is for the purpose of positively feeding the glass sheets through the washer which may be of any well known form. Within the washer 3, water and a detergent are first used to scrub both sides of the sheet and thereafter both sides of the sheet are thoroughly rinsed before passing out of the washer 3. The temperature of the wash water is preferably around 200° F. so as to thoroughly heat the sheets and thereby assist the final drying operation under the heater 5 as hereinafter described. Rinse water, however, should be held to about 150° F. to avoid evaporation before reaching the blotting rolls. As the sheets leave the washer they pass through a series of suitable blotting rolls where they are substantially dried and pass beneath the blower fan 4. Thereafter the sheets pass through the heater 5, which comprises a series of suitable electric heating elements, to complete the drying operation by removing substantially all the adsorbed moisture from the top face of the sheet.

During the foregoing the sheets A and B have been progressing in pairs side by side through the washer and drier and now emerge from the drier for passing through the mica applicator. As illustrated in Fig. 1 of the drawings, one sheet A of each pair passes beneath the mica applicator and the other sheet B passes alongside the mica applicator but beneath the blower 7 which operates on both sheets after they pass the mica applicator.

The mica applicator 6 as illustrated in Figs. 3 and 4 of the drawings is entirely closed except at the bottom as will be hereinafter set forth. The applicator structure comprises a jacket 8 of substantially rectangular form and closed on all four sides. The top of the jacket 8 is preferably closed by a removable cover 9 and a suitable sealing gasket is placed between the cover 9 and the jacket 8. As shown by dotted lines of Figs. 3 and 6 of the drawings the interior of the jacket 8 comprises a transversely extending cloud chamber 10, a similarly extending smaller settling chamber 11 which are connected by a suitable aperture 12. The aperture opening is controlled by a suitable damper or dampers 13. All four sides 10a, 10b, 10c and 10d of the cloud chamber are sloping as shown in Fig. 3 and Fig. 5 and converge adjacent the bottom of the jacket where they are connected by a suitable closure member 14. The sloping side members of cloud chamber 10 are preferably made of rust resisting material such as stainless steel and suitably polished on their inner faces for a purpose hereinafter set forth. Adjacent the top of the cloud chamber 10 is a transverse member 15 forming a common wall for the cloud and settling chambers. At the base of member 15 is a transversely extending shaft 16 suitably journalled on the jacket sides. The damper 13 is mounted on the shaft 16. At the exterior of the jacket 8 is a suitable handle 17 mounted on shaft 16 for manipulating the damper 13.

The means for maintaining a state of turbulency within the atmosphere of the cloud chamber 10 comprises a baffle plate 18 which is preferably circular, the fan 19, and the fan 20 all of which are mounted in spaced relation upon the shaft 21 extending through a suitable aperture 22 in the closure member 14 at the bottom of the cloud chamber 10. The baffle plate 18 has a plurality of apertures 23 therein permitting air currents to move downwardly past the baffle plate. A drive pulley 24 is mounted on a suitable extension of the shaft 21 and this pulley is in turn driven by a suitable mechanism including motor 25 at best illustrated in Fig. 4.

Suitable mechanism Fig. 7 is provided adjacent the top of cloud chamber 10 for feeding mica thereto. This mechanism includes a bin 26 having a removable cover 27 for loading powdered mica therein. Beneath the bin 26 is a receiving chamber 28 which houses a suitable screw conveyor 29 extending into the cloud chamber 10. The outer end of conveyor screw 29 extends beyond chamber 28 and has a suitable driven pulley 30 mounted thereon which is connected with a driving pulley 31 mounted on the shaft of a suitable driving means such as the motor 32. This mechanism serves to feed mica, at a uniform rate, to cloud chamber 10. To overcome any tendency of the powdered mica to bridge over within the bin 26 a suitable vibrating mechanism 33 is preferably mounted upon the cover 27 so as to ensure uniform continuous feed of the mica to the receiving chamber 28.

As best shown in Fig. 4 of the drawings, two lamps 34 are preferably provided at one side of the cloud chamber 10 and between them is disposed window 35 to enable the operator to observe the uniformity and density of the cloud within the cloud chamber. Above the window 35 and within the cloud chamber 10 is mounted a suitable wiper member 36 similar to a windshield wiper, and operable from the outside by means of the handle 37 enabling the operator to keep the window 35 free of mica particles. Preferably, lamps 34 are of the infra-red type to maintain the mica free from moisture.

The jacket member 8, adjacent the bottom thereof, is extended in the direction of travel of the glass sheets as indicated at 38 on Fig. 3 of the drawings. The purpose of this extension is to provide a baffle preventing air from the blower, hereinafter described, from setting up turbulency within the settling chamber 11. Above the baffle member 28 is mounted a suitable fan 39 provided with nozzle 40 extending transversely of the conveyor and outwardly of the extension 38 for blowing air upon the glass sheets moving from beneath the extension 38 and along the conveyor. As shown in Fig. 1 of the drawings the nozzle 40 extends transversely of the conveyor 1 and simultaneously blows air upon both sheets A and B of each pair of glass sheets moving along the conveyor.

Referring now to Figs. 3 and 6 of the drawings wherein are shown detail arrangements of the cloud forming and damper mechanisms, the aperture 12 connecting the cloud chamber 10 with the settling chamber 11 preferably extends the full width of these chambers but may be varied in size if considered desirable. The mechanism providing turbulency within the cloud chamber comprises the impeller fan 20 which impels air currents upwardly against baffle plate 18 which, in turn, deflects the air lateral towards the sides of the chamber 10. The fan 19, disposed between baffle 18 and fan 20 imparts a circular motion to the deflected air currents causing increased turbulency and guides the air upwards past the baffle into the upper portion of the cloud chamber 10. To provide recirculation of air current from above to beneath baffle 18, without interrupting upward passage of the air at the sides of the baffle, apertures 23 are provided in baffle plate 18.

Mica of preferably 1,000 mesh is fed into the upper portion of the cloud chamber 10 by means of conveyor screw 29 and a considerable portion thereof falls upon the converging sides of chamber 10. The polished faces of the chamber 10 cause the mica to slide down into the bottom of the chamber where the fan 20 picks it up and impels it towards baffle plate 18 where it is suspended by the turbulent air currents which carry it to the upper portion of the chamber. The density of the mica cloud so formed is a function of the speed of the fans and the rate of delivery of mica to the chamber. Once the degree of turbulency is established to effect uniformity of diffusion of mica throughout chamber 10 above the baffle 18, the mica feed can be adjusted to produce the desired cloud density. A density sufficient to obscure the details of the feed mechanism from an observer looking through window 35 while lamps 34 are burning has been found to give good coating results.

Another means of controlling coating of the glass sheets beneath the settling chamber are the damper or dampers 13. Damper 13 performs the dual function of controlling admission of mica laden air to the settling chamber and the substantially total destruction of turbulency within the air admitted to the settling chamber. Hence by retaining air for different periods within the cloud chamber the density of the cloud can be varied for any given rate of feed of mica. Where the rate of delivery of mica laden air to settling chamber 11 is sufficiently small, one damper 13 has been found effective in destruction of turbulency within the air passed into chamber 11. Where greater volumes of mica are required damper 13 is adjusted to admit more air and in some cases it has been desirable to provide a second damper **13*a* similar to that illustrated in dot and dash lines on Fig. 6. Uniform coating requires absence of turbulency within chamber 11, wherein the diffused mica within the chamber is deposited by gravity upon the glass sheet passed beneath the bottom opening of chamber 11. This latter opening is preferably the full cross section of chamber 11 so as to impose no obstructions to the free falling of the mica. This opening also provides escape for air within chamber 11 so that no appreciable turbulency is created by continual feed of mica laden air into the chamber 11 from cloud chamber 10. Window 41 in settling chamber 11** permits operator to observe conditions within the chamber.

It has been observed that mica adheres readily to glass and also to rough metal surfaces. The degree of turbulency within the cloud chamber has been found sufficient to prevent the diffused mica particles from having a static charge imposed thereon which would cause clumps of mica particles to form and possibly pass over into the settling chamber where they would be deposited upon the glass thereby causing streaks which would not laminate out in the auto-clave. However, the mica particles do tend to adhere to the metal portions of the chamber 10 and 11, and subsequently form clumps. If these clumps are not frequently removed, they have a tendency to become detached and have been deposited upon the glass. Catch troughs **11*a*, at the bottom of settling chamber, help prevent the clump sliding down the chamber walls and falling upon the glass sheet. For this reason all metal parts within chambers 10 and 11 are preferably made of corrosion resistant metal and are polished all over or where exposed to the mica. Likewise it has been found desirable to periodically close down the mechanism and wipe the accumulated mica from the surfaces of the chambers 10 and 11, as well as any metal mechanism within the chambers. To provide access to the chambers, cover 9 of the chamber casing 8 is made removable. When the cover 9 is removed it is also recommended that accumulated mica particles upon cloud chamber closure member 14 be also removed. These particles are those of sufficient size to resist being airborne by fan 20 and remain upon member 14**.

It has been observed that mica adheres very readily to glass but that the mica flakes do not have any pronounced tendency to adhere to each other. During the passage of plate A beneath the bottom of the settling chamber 11 it is probable that some mica flakes will fall upon mica previously deposited upon the plate, but as the plate moves through the baffle chamber 38 and is exposed to the blast or air from nozzle 40 the air will blow from the plate those mica flakes deposited upon mica but not the mica flakes deposited directly upon the glass. The net result of exposing the sheet to the air blast, after passage through the settling chamber, is to leave a layer of mica upon the sheet but one flake deep. The uncoated sheet moving down the other side of the conveyor past the mica applicator also passes under the fan nozzle 40 and the air blast is sufficient to remove any room dust deposited upon the plate during its passage after leaving the washer. An operator then assembles the two sheets together with the coated surface between the plates and sends them to the bending lehr.

Where straight line operation is permissible the speed of the mica applicator conveyor can be synchronized with the speed of the bending lehr so that the operator after removing the sheets from the mica applicator conveyor can place the assembled sheets upon a bending mold for passage through the lehr. Within the lehr the bending temperature of the glass seldom rises over 1400° F. and the fusion temperature of mica is about 2200° C. Obviously, therefore, any coating of mica of sufficient thickness and uniformity to maintain separation of the sheets will effectively prevent fusion of the sheets during the bending operation.

After the pair of sheets have been bent to the desired contour they are removed from the bending mold and transferred in their assembled condition to the laminating department where the sheets are separated and, without further washing, the plastic inner layer is inserted between the sheets for loading into the auto-clave. It has been found that such mica as remains upon the sheets and is visible before auto-claving the assembled sheets, is no longer visible after the auto-claving operation. This phenomena is known as "laminating out" of the mica. The so called "laminating out" of mica in the auto-clave appears to be due to wetting of the mica by the plastic inner layer under the influence of temperature and pressure with the auto-clave. Optical contact between the rough edges of the mica particles and the plastic inner layer eliminate "light" scattering, and the only remaining factor then would be due to refractive index differences between the mica, the plate glass and the plastic inner layer. This difference is quite small as indicated and the following tabluation:

| Material: | Refractive index |
|---|---|
| Mica | 1.590 |
| Plate glass | 1.522 |
| Vinyl butyral plastic | 1.477 |

A sufficient number of tests have been run so as to definitely establish that well finished plate glass may be laminated after bending without removing the mica. A further series of tests have established that coating thickness of mica resulting from two, three and even four successive passes of the sheet beneath the settling chamber have had the mica sufficiently "laminated out" as to be commercially acceptable, passing the inspection of experienced inspectors of this class of work. This would indicate that a wide range of thickness of the mica coating is permissible. It has been found, that in cases of heavy coatings upon the glass, an increase of 15° to 25° F. in auto-clave temperature assists "laminating out."

The operator controlling the mica applicator can maintain a sufficient check on the thickness of mica coating applied by looking along the sheet to ascertain if a light even coating appears to have been applied. Photo-micrographs of mica particles deposited by the mica applicator giving the foregoing light-even appearing coat show the particles to be in most cases irregular flakes or plates as might be expected from the cleavage of mica. Measurements give a particle size from two to thirty microns with an average spacing of one hundred microns. The mica flake adheres to the glass surface firmly enough to resist vibration of air blast but can be readily wiped off with a cloth if desired. Measurements indicate that only from one to two per cent of the surface need be actually covered by the mica particles.

Heat drying of the plates, prior to passing through mica applicator, has been found beneficial in elimination of all tendencies for fusion of the plates during bending when using the light coatings above referred to. After the plates leave the washer and pass through the squeegee, blotting rolls and washer air blast most of the water is removed from the plates. It has been found however that this treatment may leave water remaining on the edges of the plate and does not completely remove the adsorbed water from the surface of the plate. If this adsorbed moisture remains on the plates, after they enter the bending lehr, evaporation of the water results in fusion of the plates and must therefore be removed or a considerably heavier coating of mica applied. It was for this reason that a radiant heater is placed in advance of the mica applicator so as to effectively remove all moisture from the plates prior to their entering the mica applicator. To facilitate the prompt removal of water and to avoid excess retention of the plates under the radiant heater, it has been found beneficial to use heated water in the rinsing operation so as to bring the plates closer to the evaporation temperature prior to leaving the washer and thereby reducing the time the plate must spend under the radiant heater.

As previously mentioned mica applied in the manner hereinbefore described has also found to be effective in the protection of the adjacent surfaces of glass sheets when stacked or packaged for transportation or storage. A coating of mica dust sufficient to prevent fusion in the bending lehr has also been found to be effective in preventing damage to glass surfaces when packing or during transportation. The use of mica for this purpose has been found to be superior to materials heretofore used inasmuch as mica adheres well to the glass so as not to be readily displaced through jars or bumping of the glass or under air blast. The particles however may be readily removed by wiping when the glass is removed from the package for use in its intended purpose.

The question of storage of glass sheets is one that has plagued the glass industry for some time. Extensive investigations carried out by a number of the glass manufacturing companies have indicated that, under certain conditions of temperature and moisture, long time storage of packaged glass or glass in stacks on pallets cannot be satisfactorily carried out without the use of some form of a spacer between the sheets which extends continuously from margin to margin of the sheets and covers the entire face of the sheets. The reason for this appears to be that any other form of a spacer between the sheets leaves openings through which moisture laden atmosphere passes and the water collecting on the glass surfaces causes the phenomenon known as staining. It is for this reason that long time storage under extreme variations of temperature and high humidity conditions is not recommended when using mica as a spacer. It has been found however that storage under normal conditions can be safely carried out for limited periods. The particular advantage of the use of mica applied in the manner hereinbefore set forth resides in the great adherence of the mica to the glass for the purpose of forming spacers between the glass and protection of glass sheets and yet its easy removal by wiping when so desired.

We claim:

1. The method of forming bent laminated glass sheets comprising the steps of, successively passing matched pairs of glass sheets through a washing and drying apparatus for effective removal of all foreign matter and adsorbed water from at least one surface of each sheet, applying a uniform coating of finely divided mica to at least one cleaned surface of each pair of sheets, assembling the sheets in pairs with the cleaned surfaces in opposing relation, passing the assembled sheets through a heated passage and upon suitable molds for bending the pairs of glass sheets to the desired contour, separating the sheets and inserting a plastic inner layer without removing the mica from the coated surface of one of the sheets, then re-assembling and treating these sheets in an auto-clave in the usual manner.

2. In a method of forming bent laminated glass shapes, the steps of applying a thin uniform coating of finely divided mica to the inner face of one of a pair of glass sheets, heat bending the pair of glass sheets, inserting a plastic inner layer between the bent sheets without removal of the mica coating, and bonding the whole in an auto-clave under standard conditions of time, temperature and pressure to cause the optical union of the mica and the plastic inner layer.

3. In a method of forming heat bent laminated glass sheets the steps of, applying a light uniform coating of finely divided mica to the inner face of at least one of a pair of flat glass sheets prior to bending, and applying the plastic inner layer between the bent glass sheets without previous removal of the mica coating.

4. In a method of forming heat bent laminated glass, the steps of applying a light uniform coating of finely divided mica to a face of one of a pair of flat sheets prior to bending, removing excess mica not adhering directly to the glass, assembling the pair of sheets with the coated surface inwardly, heat bending the pair of glass sheets, inserting a suitable plastic inner layer between the bent glass sheets without removal of the mica, then bonding the assembled sheets and plastic inner layer in an auto-clave in the usual manner.

5. In the method of forming heat bent laminated glass, the steps of applying a substantially uniform coating of finely divided mica to the inner face of one of a pair of clean dry flat glass sheets, heating and bending the flat sheets without fusion between the adjacent glass surfaces by reason of separation between the sheets afforded by the mica, inserting a suitable plastic inner layer between the sheets without removal of the mica, then effecting lamination in the usual manner within an auto-clave at a temperature about 15 to 25° above normal to effect laminating out of the mica.

6. In the process of forming heat bent laminated glass the steps of, applying a substantially uniform coating of finely divided mica particles to the inner face of one of a pair of flat glass sheets to effect about one per cent to two per cent total coverage of the surface, heat bending the assembled pair of sheets to the desired contour, then inserting the plastic inner layer between the bent glass sheets without removal of the mica particles.

References Cited in the file of this patent

UNITED STATES PATENTS

| Number | Name | Date |
|---|---|---|
| 199,583 | Siemens | Jan. 22, 1878 |
| 633,694 | Herbst | Sept. 26, 1899 |
| 685,512 | Hanks | Oct. 29, 1901 |
| 1,068,733 | Bradley | July 29, 1913 |
| 1,455,544 | Minton | May 15, 1923 |
| 1,494,157 | Desautels | May 13, 1924 |
| 2,143,479 | Esselen | Jan. 10, 1939 |
| 2,196,470 | Montgomery et al. | Apr. 9, 1940 |
| 2,205,003 | Walters | June 18, 1940 |
| 2,256,024 | Hill | Sept. 16, 1941 |
| 2,377,849 | Binkert | June 12, 1945 |
| 2,378,016 | Hubbard | June 12, 1945 |
| 2,392,770 | Ryan | Jan. 8, 1946 |